UNITED STATES PATENT OFFICE.

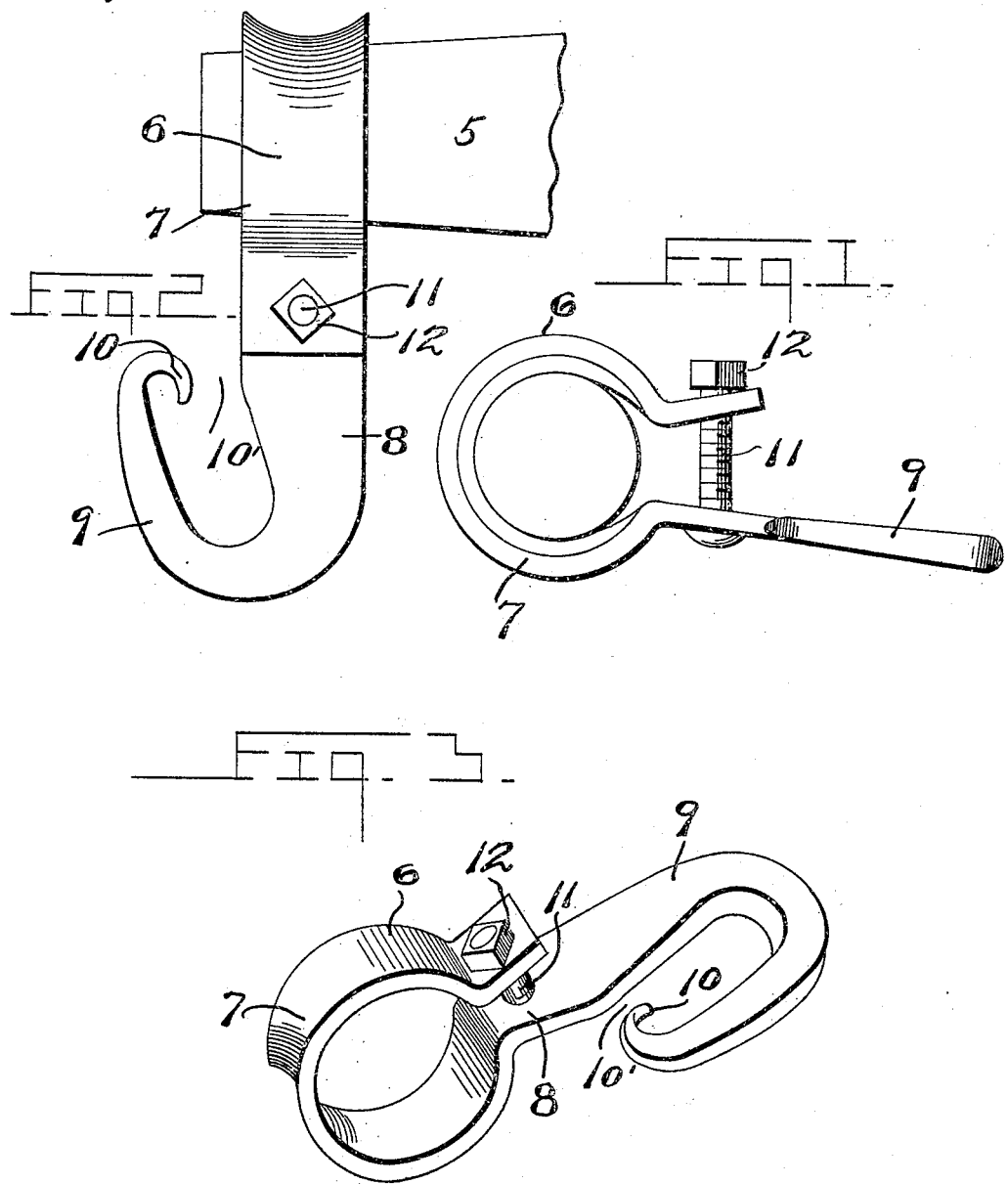

JOHN E. WIESE, OF SPEARVILLE, KANSAS.

SWINGLETREE-HOOK.

959,983.  Specification of Letters Patent.   Patented May 31, 1910.

Application filed September 4, 1909. Serial No. 516,175.

*To all whom it may concern:*

Be it known that I, JOHN E. WIESE, a citizen of the United States, residing at Spearville, in the county of Ford and State of Kansas, have invented certain new and useful Improvements in Swingletree-Hooks, of which the following is a specification.

This invention relates to certain new and useful improvements in swingletree hooks, and has for its object to provide, as a new article of manufacture, a strap, iron or ferrule which can be made of malleable cast iron or cold rolled steel, for use upon swingle or doubletrees, said ferrule being extended to form a suitable hook portion in which one of the links of a draft chain may be disposed.

Another object is to greatly cheapen the cost of manufacture of hooks of this character, without sacrificing their strength or durability.

A further object is to provide a hook having a concavo-convex ferrule portion, which is adapted to bind upon the swingle or doubletree upon the tightening of the clamping bolt.

With these and other objects in view, the present invention consists in the combination and arrangement of parts as will be hereinafter more fully described and particularly pointed out in the appended claim, it being understood that changes in the specific structure shown and described may be made within the scope of the claim without departing from the spirit of the invention.

In the drawings forming a part of this specification, and in which like numerals of reference indicate similar parts in the several views, Figure 1 is an end elevation of a swingletree showing my improved hook attached thereto. Fig. 2 is a top plan view. Fig. 3 is a perspective view of the hook removed.

Referring to the drawing 5 indicates the swingletree upon the end of which my improved hook 6 is attached. The hook comprises a single length of malleable iron or cold rolled steel as may be preferred, and is formed with the approximately circular ferrule portion 7. The end portions are extended laterally from the ferrule 7, one of which is comparatively short terminating adjacent to the swingletree. The other of the end portions 8 is formed into the hook 9, and extends a considerable distance in advance of the ferrule 7, and is then bent upon itself, the extreme end thereof being reduced in thickness and extended outwardly as shown at 10. A clamping bolt 11 extends through the end 8 and the spaced shortened end portion of the bar 6. Upon the upper end of this bolt a nut 12 is threaded and is adapted to frictionally engage the upper surface of the bar and bind the ferrule 7 against the periphery of the swingletree.

It will be noted that the circular ferrule portion 7 is of concavo-convex formation, thus providing for the absolute security of the hook upon the swingletree, when the clamping nut has been adjusted upon the bolt 11. A compressing contact of the ferrule upon the swingletree is thus obtained, so that the binding of the ferrule will be more effectual, biting into the wood and preventing any possibility of longitudinal movement of the hook.

The reduced forwardly extending termination 10 of the hook 9, serves to prevent the accidental removal of the draft chain from the hook, as unless the chain link is in exact alinement with the entrance 10', its release therefrom will be prevented, thus obviating the necessity of constantly stopping the team to hook the draft chain.

From the above description it will be noted that I have provided a swingletree hook which is extremely inexpensive to manufacture, may be rigidly attached to the swingletree, and is highly durable and efficient in use.

The nut 12 is flush with the upper end of the clamping bolt 11, when the hook is secured in position, thus enhancing the neat and attractive appearance of the device. The hook may also be easily and quickly detached should the swingletree be accidentally broken.

What is claimed is:

As an article of manufacture, a swingletree hook comprising a single length of malleable iron or steel bent adjacent to one end to provide a ferrule, the end of the bar being extended laterally therefrom, said ferrule being of concavo-convex cross sectional form, the other end of said bar being extended in parallel relation to said lateral end portion and having a hook formed thereon, the extremity of said hook being extended outwardly, a clamping bolt extending through an intermediate portion of the bar and one of the ends thereof adjacent to the ferrule, and a nut having threaded engagement upon said bolt adapted to bind the inner convex surface of the ferrule upon the periphery of a swingletree to secure the hook in position thereon.

In testimony whereof I affix my signature, in presence of two witnesses.

JOHN E. WIESE.

Witnesses:
GEO. C. RAVENKANY,
L. R. WEEKLY.